United States Patent [19]

Okada et al.

[11] Patent Number: 4,670,344
[45] Date of Patent: Jun. 2, 1987

[54] MICROCAPSULE FOR PRESSURE-SENSITIVE RECORDING PAPER AND PROCESS OF PREPARING SAME

[75] Inventors: Yoshio Okada; Yuriko Igarashi, both of Iwaki, Japan

[73] Assignee: Kureha Kagaku Kogyo Kabushiki Kaisha, Tokyo, Japan

[21] Appl. No.: 623,527

[22] Filed: Jun. 21, 1984

Related U.S. Application Data

[63] Continuation-in-part of Ser. No. 293,308, Aug. 17, 1981, abandoned.

[30] Foreign Application Priority Data

Aug. 20, 1980 [JP] Japan ................................. 55-114333
Jul. 9, 1981 [JP] Japan ................................. 56-107398

[51] Int. Cl.$^4$ ........................ B01J 13/02; B32B 27/42
[52] U.S. Cl. ................................. 428/402.21; 264/4.7; 503/215; 428/914
[58] Field of Search ..................... 264/4.7; 428/402.21

[56] References Cited

U.S. PATENT DOCUMENTS 3,565,559  2/1971  Sato et al. ...................... 264/4.3 X
3,607,775  9/1971  Yoshida et al. .................. 264/4.7 X
3,796,669  3/1974  Kiritani et al. .................. 264/4.7 X
4,105,823  8/1978  Hasler et al. .................... 252/316 X
4,223,060  9/1980  Raine et al. ..................... 252/316 X

FOREIGN PATENT DOCUMENTS 1903704  10/1969  Fed. Rep. of Germany .
2441417   6/1980  France .
55-51431  4/1980  Japan .
1301052  12/1972  United Kingdom .
1507739   4/1978  United Kingdom .
2001927   2/1979  United Kingdom .
1543454   4/1979  United Kingdom .
2009218   6/1979  United Kingdom .
2041319   9/1980  United Kingdom .

Primary Examiner—Richard D. Lovering
Attorney, Agent, or Firm—Wegner & Bretschneider

[57] ABSTRACT

A microcapsule enclosing a color-former solution for a pressure-sensitive recording paper is prepared by a process in which a water-soluble cationic urea resin and at least one of prepolymer selected from the group consisting of melamine-formaldehyde prepolymer, urea-formaldehyde prepolymer and melamine-urea-formaldehyde prepolymer are polycondensed on the surface of a dispersed solvent droplet containing a color-former in the presence of an anionic surfactant, while causing complex-coacervation between the water-soluble cationic urea resin and the anionic surfactant.

7 Claims, No Drawings

MICROCAPSULE FOR PRESSURE-SENSITIVE RECORDING PAPER AND PROCESS OF PREPARING SAME

This is a continuation-in-part of Ser. No. 293,308, filed 8-17-81 now abandoned.

This invention relates to a microcapsule for a pressure-sensitive recording paper and a process for preparing the same. In particular, the invention relates to a microcapsule which is superior in solvent-resistance, thermal stability and light stability to a conventional microcapsule and is suitable for a pressure-sensitive recording paper.

A conventional pressure-sensitive recording paper comprises an upper sheet (CB sheet) coated on the back with microcapsules enclosing a solution of colour-former, for instance, a leuco-type dye and a lower sheet (CF sheet) coated on the front with a colour-developer such as an acid clay or an acidic resin. When the CB sheet is written or typed, the microcapsule are broken upon pressure so that the contents are transferred to CF sheet, where the colour is developed by the interaction of the colour-former and the acidic materials.

A pressure-sensitive recording paper has been used in various fields, particularly for a recording paper of computers, with improvement of business efficiency, and a microcapsule is required which is excellent in moisture stability, thermal stability and light stability because the pressure-sensitive recording paper tends to be used even under severe environmental conditions. Further, a microcapsule is required which is excellent also in solvent-resistance mentioned hereinafter in preparing a pressure-sensitive recording paper.

Namely, a pressure-sensitive recording paper is conventionally manufactured by coating on a paper microcapsule-slurry comprising a water-soluble binder and additives in water as a dispersion medium. In this case, however, the drying rate is slow due to the water-containing paper and also the paper lacks dimensional stability because of wrinkles.

A faster-drying dispersion medium may be preferably used in order to solve the above-mentioned problems and improve the productivity. Such a suitable dispersion medium may be an organic solvent conventionally used for printing ink and the like, for example, an alcohol such as isopropyl alcohol and ethyl alcohol, an ester such as ethyl acetate, a ketone such as methyl ethyl ketone, a hydrocarbon solvent such as kerosene, toluene and xylene, or a vegetable oil such as linseed oil and castor oil. However, a microcapsule conventionally practised or proposed can not be stable in the above-mentioned organic solvent. A microcapsule, which can be stable in the organic solvent, may accomplish faster drying rate, and improve the productivity without causing wrinkle problem. Furthermore, the microcapsule may enable a partially coated pressure-sensitive recording paper by spot printing. These are the reason why a microcapsule excellent in solvent-resistance is required.

The term "solvent-resistance" herein means the stability of a microcapsule in an organic solvent mentioned above.

Gelatine has been mainly used as the wall material of microcapsules (hereinafter referred to as gelatine capsule). The gelatine capsule, however, has poor moisture- and light stability and also has no solvent-resistance.

On the other hand, various microcapsules have been proposed in which the wall is made of hydrophobic polymers. An urea-formaldehyde resin, a melamine-formaldehyde resin, a polyamide or a polyurethane has been used as a wall material. The microcapsule wall is prepared by so-called "in situ" or surface polymerization technique. However, these conventional microcapsules are insufficient for a pressure-sensitive recording paper, particularly poor in solvent-resistance, although they are slightly improved in moisture- and light stability as compared to a gelatine capsule.

For example, a microcapsule which consists of urea-formaldehyde resin and is formed by a conventional process has insufficient solvent-resistance although it is more improved than a gelatine capsule. Other methods using urea-formaldehyde resin have been proposed in which a polymer having different properties from urea-formaldehyde resin such as ethylene-maleic anhydride copolymer (U.S. Pat. No. 4,087,376), styrene-maleic anhydride copolymer (Japanese Patent Laying Open No. 108706/79) or a reactive tenside (U.S. Pat. No. 3,778,383) is used together with an urea-formaldehyde resin, however, the microcapsules obtained by these methods are insufficient in solvent-resistance.

Further, a microcapsule which is made of melamine-formaldehyde resin by a conventional method is also poor in solvent-resistance. For example, a method using a styrenemaleic anhydride copolymer (U.S. Pat. No. 4,233,178), a method using a reactive tenside with a hydrophobic and a hydrophilic groups derived from a urea-formaldehyde compound or a melamine-formaldehyde compound (U.S. Pat. No. 3,778,383), and a method using a cationic urea-formaldehyde prepolymer and acrylamide-acrylic acid copolymer (U.S. Pat. No. 4,105,823) together with a melamine-formaldehyde prepolymer have been proposed.

However, the microcapsules obtained by these methods are still insufficient particularly in solvent-resistance, although there are some improvements in moisture- and light stability compared with that of a gelatine capsule.

Further, methods for preparing a microcapsule with a wall comprising melamine, urea and formaldehyde have been proposed.

For example, a method using only melamine-urea-formaldehyde resin prepolymer, a method using a reactive tenside and a material having hydrophobic- and hydrophilic groups derived from an urea-formaldehyde compound or melamine-formaldehyde compound (U.S. Pat. No. 3,778,383), and a method using a styrene-maleic anhydride copolymer and a vinyl acetate-maleic anhydride copolymer (Japanese Patent Laying Open No. 47139/80) together with melamine, urea and formaldehyde have been known in the prior art.

It is an object of the invention to provide a microcapsule for a pressure-sensitive recording paper, said microcapsule has excellent solvent-resistance, thermal stability, and light stability due to its uniform and compact wall.

A microcapsule of the invention comprises a polycondensate of a water-soluble cationic urea resin with at least one prepolymer selected from the group consisting of melamine-formaldehyde prepolymer, urea-formaldehyde prepolymer, and melamine-urea-formaldehyde prepolymer (hereinafter referred to as "prepolymer"), and is prepared by forming a microcapsule wall around the surface of a solvent droplet which contains a colour former and is dispersed in an aqueous solution mixture consisting of the water-soluble cationic urea resin, at least one of the prepolymer and an anionic surfactant.

The formation of a microcapsule wall is accomplished by a polycondensation of the prepolymer and the water-soluble cationic urea resin on the surface of the solvent droplet, by adjusting the pH of the aqueous solution in an acidic condition.

In this process, the polycondensation of the prepolymer and the water-soluble cationic urea resin proceeds together with the complex coacervation caused by the interaction between the water-soluble cationic urea resin and the anionic surfactant.

In the invention, the very important characteristics are that the water-soluble cationic urea resin and the anionic surfactant are used together with the prepolymer. A very stable aqueous dispersion of the colour-former solution can be maintained throughout the microencapsulation process due to the presence of a small amount of the water-soluble cationic urea resin and the anionic surfactant. Therefore, a uniform and compact wall can be formed without causing any coagulation or precipitation.

A microencapsulating process of the invention is described in detail hereinafter.

In the first step of the process of the invention, a colour-former solution is dispersed in an aqueous mixture, in which at least a water-soluble cationic urea resin and an anionic surfactant are present, by a suitable means such as homogenizer, stirrer or ultra-sonic so that a diameter of the liquid droplet is around 1 to 8 $\mu$m. The prepolymer may be added to the aqueous dispersion during the process. Then an acid-catalyst is added to the aqueous dispersion containing the prepolymer with gentle stirring. The pH and the temperature are maintained in the range of 2.5° to 6.0° and 15° to 60° C., respectively, for 2 to 15 hours. In addition, an adequate amount of water may be added during the polycondensation reaction.

The prepolymer of the invention may be made of melamine and/or urea and formaldehyde, and includes melamine-formaldehyde prepolymer, urea-formaldehyde prepolymer and melamine-urea-formaldehyde prepolymer which includes a mixture of the melamine-formaldehyde prepolymer and the urea-formaldehyde prepolymer and a prepolymer obtained by reacting melamine, urea and formaldehyde simultaneously.

"Melamine-formaldehyde prepolymer" herein indicates any one of methylol melamines such as mono- to hexamethylol melamine, a mixture of the methylol melamines of different hydroxymethylation, a mixture of the methylol melamine(s), melamine and formaldehyde and any oligomer(s) obtained by the further reaction of melamine and formaldehyde, e.g. methylol melamine(s) with the polymerization degree of 2 to 10 which may be subjected to encapsulation in the form of a transparent colloidal solution obtained by treating the oligomers with hydrochloric acid. Further, the melamineformaldehyde prepolymer may be prepared as Example described hereinafter.

"Urea-formaldehyde prepolymer" of the invention indicates any one of methylol ureas such as nomo- to tetramethylol urea, a mixture of the methylol ureas of different degree of hydroxy-methylation, a mixture of the methylol urea(s), urea and formaldehyde, any oligomer(s) obtained by the further reaction of urea and formaldehyde, e.g. methylol urea(s) with the polymerization degree of 2 to 5 and having hydrophilic group(s) which may be used in the form of a transparent colloidal solution.

The molar ratio of formaldehyde to melamine and urea in the raw material used in preparation of the prepolymers when using the melamine-urea-formaldehyde prepolymer is determined according to the following formulas:

$$R = \frac{F}{U + M}$$

$$F = aU + bM$$

wherein
R is molar ratio of formaldehyde to the total of melamine and urea,
F is moles of formaldehyde,
U is moles of urea,
M is moles of melamine, the coefficient a is in the range of 0.6–4.0, preferably 1.0–3.0 and the coefficient b is in the range of 1.0–9.0, preferably 1.6–7.0.

The ratio of formaldehyde to melamine and/or urea is an important factor for the formation of the microcapsule wall which is homogeneous and excellent in mechanical strength, impermeability and particularly solvent-resistance.

The properties of the microcapsule are varied by changing the ratio of melamine and urea in the raw material. For example, when the prepolymer is a melamine-formaldehyde prepolymer or a prepolymer of which the composition ratio is close to a melamine-formaldehyde prepolymer, a microcapsule obtained has a large specific gravity and can be easily separated, resulting a high concentration of microcapsule in the slurry. On the other hand, when a stable slurry of microcapsule is required, the larger ratio of urea is preferable. The molar ratio of melamine to urea is preferably between 0.15 to 5.0 from the view point of solvent-resistance.

The amount of the prepolymer used in encapsulation is preferably in the range of 0.1 to 1 g per 1 g of the colour-former solution.

The "water-soluble cationic urea resin" indicates an urea-formaldehyde resin prepared by introduction of a cationic modifier. The water-soluble cationic urea resin is easily prepared by adding a modifier to an urea-formaldehyde prepolymer and then polycondensing in a known manner. A modifier includes tetra ethylene pentamine, diaminoethanol, dicyandiamide, diethyl aminoethanol, guanyl-urea and the like.

The weight ratio of the water-soluble cationic urea resin to the prepolymer is preferably in the range of 0.01:1 to 0.5:1.

The anionic surfactant of the invention is a low molecular weight surfactant selected from the group consisting of salts of aliphatic acids, sulfate esters of higher alcohols, salts of alkylarylsulfonates. Sodium dodecylbenzenesulfonate is preferred.

The weight ratio of the anionic surfactant is in the range of 0.01 to 0.1 parts by weight to one part of the water-soluble cationic urea resin, and this weight ratio causes a stable dispersion of the colour-former solution in the wide pH range, i.e. 2.5 to 6.0.

The acid-catalyst includes a low molecular weight carboxylic acid such as formic acid, acetic acid and citric acid, an inorganic acid such as hydrochloric acid, nitric acid and phosphoric acid, an acidic salt or an easily hydrolyzable salt such as aluminum sulfate, titanium oxychloride, magnesium chloride, ammonium chloride, ammonium nitrate, ammonium sulfate and ammonium acetate and a mixture thereof.

In the process of the invention for preparing a microcapsule, the colour-former solution is advantageously emulsified to form a stable dispersion with low viscosity and a microcapsule wall formed has a very high impermeability as compared with a conventional process such as a process using only an aqueous solution of prepolymer, using a cationic urea resin with a prepolymer and using a reactive tenside derived from an urea resin with a prepolymer (for example, U.S. Pat. No. 3,778,383).

The reason why the process of the invention has the above-mentioned advantages can be explained due to the complex-coacervation formed between the water-soluble cationic urea resin and the anionic surfactant in a certain composition thereof and a certain pH range. With the same composition, mild coacervation is occurred in the pH range of 4 to 6 and violent coacervation in the pH range of about 7 and below 3. Accordingly, the emulsifying step of the colour-former solution must choose the pH range where coacervation is mildly occurred in order to prevent the agglomeration of particles. Accordingly, the pH is adjusted to the preferable range in the microencapsulation step by adding an acid-catalyst. In the microencapsulation step, polymerization of the prepolymer and complex-coacervation are simultaneously occurred, resulting a formation of a microcapsule wall, and the water-soluble cationic urea resin is also polycondensed to form a hydrophobic polymer and to be a component of the microcapsule having compact and uniform wall. As described above, the microencapsulation of the invention is a combination of complex-coacervation and 'in situ' polymerization and the invention provides a novel method for preparing a microcapsule for a pressure-sensitive recording paper.

The microcapsule of the invention thus obtained contains a colour-former solution as a core material, and the wall is uniform and compact and comprises a polymer of melamine and/or urea and formaldehyde. The microcapsule of the invention has an excellent solvent-resistance which has not been obtained by the conventional methods, as shown in Example below. Accordingly, the microcapsule of the invention can improve the productivity of a pressure-sensitive recording paper since an organic solvent can be used in the preparation instead of the conventional aqueous slurry. Further, the microcapsule of the invention may be used in the form of an aqueous slurry, and the pressure-sensitive recording paper thus obtained also has excellent light stability.

In the invention, any colour-former known in the art of the pressure-sensitive recording paper may be employed. A solvent for the colour-former solution is, for example, alkylnaphthalene, phenylxylylethane, alkylbiphenyl, hydrogenated terphenyl, chlorinated paraffin oil, mineral oil or a mixture thereof.

EXAMPLE 1

(1a) Preparation of melamine-formaldehyde prepolymer 126 g of melamine was added to 324 g of a 37% aqueous solution of formaldehyde which was previously adjusted the pH to 9.0 by a 2% aqueous solution of sodium hydroxide. The mixture was stirred at 70° C. to dissolve melamine, then 450 g of water at 70° C. was added, and after stirring for 2 minutes, an aqueous solution of melamine-formaldehyde prepolymer was obtained by cooling to room temperature.

(1b) Preparation of water-soluble cationic urea resin

One gram of triethanolamine was added with stirring to a mixture containing 162 g of a 37% aqueous solution of formaledhyde and 60 g of urea. The pH of the mixture became 8.8, and then the reaction was carried out at 70° C. for 30 minutes. To 40 g of the reaction mixture were added 24 g of water and 6 g of tetraethylenepentamine, and the pH of the mixture was adjusted to 3 with a 15% hydrochloric acid while stirring at 70° C. The reaction proceeded for one hour. With the proceeding of the reaction, the pH of the mixture was lowered, and after adjusting again the pH to 3 by adding a 10% aqueous solution of sodium hydroxide the reaction mixture was cooled to 55° C. The reaction mixture was neutralized by adding a 10% aqueous solution of sodium hydroxide at the time the viscosity of the reaction mixture had become 200 cps, and 400 g of water was added. An aqueous solution of water-soluble cationic urea resin was obtained.

(1c) Preparation of colour-former solution

Into 300 g of di-isopropylnaphthalene, 15 g of crystal-violet lactone (CVL) and 5 g of benzoyl-leucomethyleneblue (BLMB) were dissolved to make a colour-former solution for a pressure-sensitive recording paper.

(1d) Microencapsulation

To 200 g of the aqueous solution of melamine-formaldehyde prepolymer prepared in the step (1a), were added 158 g of the aqueous solution of the water-soluble cationic urea resin prepared in the step (1b), and 10 ml of a 10% aqueous solution of triethanolamine and 100 g of water. The pH of the mixture was adjusted to 4.9 with 10% citric acid, then 3 ml of 10% Neoperex (an anionic surfactant comprising mainly sodium dodecyl-benzene-sulfonate, manufactured by Kao-Atlas Co.) and 150 ml of the colour-former solution prepared in the step (1c) was added to the aqueous mixture. Then the colour-former solution was dispersed by a homogenizer to droplets of 1 to 3$\mu$ in diameter. The pH of the aqueous dispersion was adjusted to 3.8 with a 10% aqueous solution of citric acid while stirring gently at 30° C. After one hour, 300 ml of water was added, and after further stirring for 2 hours the slurry of microcapsules was obtained which was not coloured blue in coating on a CF sheet. After filtrating the slurry by a membrane filter and air-drying, a free-flowing powder of microcapsules was obtained.

EXAMPLES 2 to 6

A microcapsule was prepared as in Example 1 provided that the conditions of preparing a prepolymer and microencapsulating are shown in Table 1.

TABLE 1

| Example No. | Condition of preparing the prepolymer | | | | Condition of microencapsulation | | | |
|---|---|---|---|---|---|---|---|---|
| | F/M[1] | Temperature (°C.) | pH | Time (min) | The prepolymer/ colour-former solution (wt./wt.) | Temperature (°C.) | pH | Time (hr) |
| 2 | 2 | 70 | 9.0 | 25 | 0.36 | 30 | 5.5 | 3 |

TABLE 1-continued

| | Condition of preparing the prepolymer | | | | Condition of microencapsulation | | | |
|---|---|---|---|---|---|---|---|---|
| Example No. | F/M[1] | Temperature (°C.) | pH | Time (min) | The prepolymer/colour-former solution (wt./wt.) | Temperature (°C.) | pH | Time (hr) |
| 3 | 8 | 50 | 9.0 | 30 | 0.36 | 30 | 3.6→2.5[2] | 3→12[2] |
| 4 | 4 | 50 | 8.5 | 60 | 0.20 | 60 | 4.0→3.0[3] | 2→3[3] |
| 5 | 4 | 60 | 9.0 | 25 | 0.50 | 40 | 4.0→3.6[4] | 2→1[4] |
| 6 | 4 | 60 | 9.0 | 25 | 0.70 | 20 | 3.6 | 3 |

Notes:
[1]The molar ratio of formaldehyde to melamine in the raw material for the prepolymer.
[2]After the reaction at the pH of 3.6 for 3 hours, the reaction proceeded at the pH of 2.5 for 12 hours.
[3]After the reaction at the pH of 4.0 for 2 hours, the reaction proceeded at the pH of 3.0 for 3 hours.
[4]After the reaction at the pH of 4.0 for 2 hours, the reaction proceeded at the pH of 3.6 for one hour.

EXAMPLES 7 to 9

A water-soluble cationic urea resin was prepared by using instead of tetraethylenepentamine in the step (1b) of Example 1, 15 g of diaminoethanol (Example 7), 10 g of dicyandiamide (Example 8) and 8 g of diethylaminoethanol (Example 9), respectively.

A microcapsule was obtained by the same manner as Example 1 except for using the water-soluble cationic urea resin respectively instead of that prepared in the step (1b) of Example 1. The microcapsule obtained had the same properties as that obtained in Example 1.

EXAMPLE 10

(10a) Preparation of urea-formaldehyde prepolymer

After mixing 146 g of a 37% aqueous solution of formaldehyde, 60 g of urea, and 0.5 g of triethanolamine, the mixture was reacted at 70° C. for one hour, then an aqueous solution of urea-formaldehyde prepolymer was obtained.

(10b) Microencapsulation

The whole aqueous solution of water-soluble cationic urea resin prepared in the step (1b) of Example 1 and 6.6 g of a 6% aqueous solution of sodium n-dodecylbenzenesulfonate (as an anionic surfactant) were added to the aqueous solution of ureaformaldehyde prepolymer prepared in the step (10a) mentioned above, and the pH of the mixture was adjusted to 5.2 with a 10% aqueous solution of citric acid.

The colour-former solution prepared in the step (1c) in Example 1 was emulsified in the mixture by a homogenizer to droplets of 2 to 8μ in diameter. The dispersion was heated to 50° C. while stirring gently, and after adjusting the pH to 3.8 with a 10% aqueous solution of citric acid, the reaction proceeded for one hour, then 1,200 g of water was added slowly. The reaction proceeded for another 2 hours, and the pH of the reaction mixture was adjusted to 2.6 with a 10% aqueous solution of citric acid and the reaction was continued for one more hour. After the reaction mixture was cooled to the room temperature and stirred further for 10 hours, a slurry of microcapsules for a pressure-sensitive recording paper was obtained.

After filtering the slurry by a membrane filter and air-drying, a free-flowing powder of microcapsules was obtained.

EXAMPLE 11

To a mixture of 40 g of a 37% aqueous solution of formaldehyde, 12 g of urea, 0.12 g triethanolamine were added. The reaction proceeded at 70° C. for one hour to obtain an aqueous solution of urea-formaldehyde prepolymer. Then 5 g of Uramine P-1500 (a 38% aqueous solution of cationic urea resin, manufactured by Mitsui-Toatsu Co.) and 1.5 g of a 10% aqueous solution of sodium n-dodecylbenzenesulfonate were added to the aqueous solution of urea-formaldehyde prepolymer, and further water was added to be 150 g in total weight, then a 10% aqueous solution of citric acid was added to adjust the pH to 5.2.

75 g of the colour-former solution prepared in Example 1 was emulsified in the above aqueous mixture by a homogenizer to be the droplets of 2 to 8μ in diameter. After a 10% aqueous solution of citric acid was added to adjust the pH to 3.5 with stirring gently, the reaction proceeded at 50° C. for one hour, and 300 g of water was gradually added for one hour with stirring and keeping the temperature at 50° C. At the end of addition of water, a 10% aqueous solution of citric acid was added to adjust the pH to 2.6. After the reaction proceeded further for 40 minutes, the reaction mixture was stirred further at room temperature for 10 hours to obtain a slurry of microcapsules for a pressure-sensitive recording paper.

EXAMPLE 12

A microcapsule was prepared as in Example 1 except for using a mixture of 135 g of melamine-formaldehyde prepolymer prepared by the same method as Example 1 and 69 g of ureaformaldehyde prepolymer prepared by the same method as Example 10 for the prepolymer.

EXAMPLES 13 to 16

The molar ratio of the melamine-formaldehyde prepolymer (MF) and the urea-formaldehyde prepolymer (UF) used for the prepolymer in Example 12 is shown in Table 2. Microencapsulation process was the same as Example 1.

EXAMPLE 17

A melamine-formaldehyde prepolymer was prepared by using melamine and formaldehyde with the molar ratio of 1:2 in the raw material in the step (1a) of Example 1. A microcapsule was prepared as in Example 12 by using the melamine-formaldehyde prepolymer thus obtained instead of the melamine-formaldehyde prepolymer in Example 12.

TABLE 2

| Example No. | Weight ratio of prepolymer in the aqueous solution (MF/UF) | M/U[1] | F/M + U[2] | prepolymer/colour-former solution (weight ratio) | KU/prepolymer[3] |
|---|---|---|---|---|---|
| 12 | 2:1 | 0.43 | 2.57 | 0.37 | 0.138 |
| 13 | 3.6:8.2 | 0.1 | 2.00 | 0.37 | 0.137 |
| 14 | 6:7 | 0.196 | 2.16 | 0.37 | 0.138 |
| 15 | 18:1 | 4.1 | 3.22 | 0.36 | 0.139 |
| 16 | 38:1 | 7 | 3.44 | 0.36 | 0.139 |

TABLE 2-continued

| Example No. | Weight ratio of prepolymer in the aqueous solution (MF/UF) | M/U[1] | F/M + U[2] | prepolymer/ colour-former solution (weight ratio) | KU/ prepolymer[3] |
|---|---|---|---|---|---|
| 17 | 7.6:6.2 | 0.43 | 1.86 | 0.38 | 0.132 |

Notes:
[1]Molar ratio of melamine (M) to urea (U) in the raw materials used in preparation of melamine-formaldehyde prepolymer and urea-formaldehyde prepolymer.
[2]Molar ratio of formaldehyde (F) to the total of melamine and urea in the raw materials used in preparation of the prepolymers.
[3]Weight ratio of water-soluble cationic urea resin (KU) to the prepolymer.

EXAMPLE 18

To 56.9 g of a 37% aqueous solution of formaldehyde (formalin) adjusted to the pH of 8.6 by a 5% aqueous solution of sodium hydroxide, 22.6 g of melamine and 20.5 g of urea were added, mixed and dissolved at 50° C. with stirring, and water was added. After one hour, melamine-urea-formaldehyde prepolymer was obtained by cooling.

A microcapsule was prepared as in Example 1 by using the melamine-urea-formaldehyde prepolymer as the prepolymer.

EXAMPLES 19 to 22

A microcapsule was prepared in the same manner as Example 18 wherein melamine-urea-formaldehyde prepolymers with the weight ratio of melamine, urea and formalin shown in Table 3 were used. In microencapulation, 4 g of 10% Neoperex was used as the anionic surfactant in Example 22 and 2 g of 10% Neoperex as the anionic surfactant and 240 g of the water-soluble cationic urea resin in Example 1 was used in Example 21.

TABLE 3

| Example No. | Weight ratio[1] | M/U[2] | F/M + U[3] | Prepolymer/ colour-former solution (weight ratio) | KU/ prepolymer[4] | A-SA/ KU[5] |
|---|---|---|---|---|---|---|
| 18 | 2.05:2.26:5.69 | 0.43 | 1.30 | 0.43 | 0.118 | 0.039 |
| 19 | 0.59:0.65:8.76 | 0.43 | 7.00 | 0.30 | 0.171 | 0.039 |
| 20 | 1.04:1.15:7.80 | 0.43 | 3.50 | 0.34 | 0.150 | 0.039 |
| 21 | 0.62:0.69:4.68 | 0.43 | 3.50 | 0.20 | 0.253 | 0.026 |
| 22 | 2.14:2.37:16.0 | 0.43 | 3.50 | 0.70 | 0.072 | 0.054 |

Notes:
[1]Weight ratio of melamine:urea:formaline in the raw material used for preparing the melamine-urea-formaldehyde prepolymer.
[2]Molar ratio of melamine to urea in the raw material used.
[3]Molar ratio of formaldehyde to the total of melamine and urea in the raw material.
[4]Weight ratio of water-soluble cationic urea resin to the prepolymer in the dispersion.
[5]Weight ratio of the anionic surfactant (A-SA) to the water-soluble cationic urea resin (KU) in the dispersion.

COMPARATIVE EXAMPLE 1

Microencapsulation was prepared as in Example 10 except for using no sodium n-dodecylbenzenesulfonate.

In the proceeding of the reaction the viscosity of the reaction mixture became much higher, and a microcapsule formed was a large particle in diameter. Further, free oils were observed in a slurry of microcapsules obtained.

COMPARATIVE EXAMPLES 2 to 6

By using 20 g of the aqueous solution of melamine-formaldehyde prepolymer prepared in Example 1 and the additives shown in Table 4 instead of the water-soluble cationic urea resin and Neoperex, 15 ml of the colour-former solution of Example 1 was emulsified by the same manner as Example 1. The pH was adjusted to 5.0 by sodium hydroxide before emulsification in the case where the pH of the dispersion became below 5.0.

The dispersion was adjusted to the pH of 3.8 with a 10% aqueous solution of citric acid while stirring slowly at 30° C. After one hour 30 ml of water was added, and then, microencapsulation was further proceeded for 2 hours with stirring. A slurry of microcapsules obtained in Comparative Example 2, 3 or 6 could not be filtered by a membrane filter, and in Comparative Example 4 or 5 free-flowing powder of microcapsules could not be obtained but a block of dried products was obtained. Accordingly, the slurries obtained in Comparative Examples 2 to 6 were dried per se by spray-drying to obtain powder. However, the dried product was not preferable for a pressure-sensitive recording paper.

Further, microcapsules obtained in the Comparative Examples was poor in soluble-resistance, and too difficult to prepare a pressure-sensitive recording paper by a spot printing method using an organic solvent. Also, a paper coated with these microcapsules, even if it was obtained, was impossible to use for a pressure-sensitive recording paper because of poor colour-development by reason of permeating loss of colour-former solution.

TABLE 4

| Comparative Example No. | Additives | Properties of microcapsules |
|---|---|---|
| 2 | 10% gelatine (8 g) | Large agglomeration, separation of microcapsules being very difficult |
| 3 | 10% EMA 31[1] (8 g) | Separation of microcapsules being very difficult |
| 4 | 20% reactive tenside[2] (4 g) | Large agglomeration |
| 5 | BC 77[3] (2 g) and 5% acrylamide-acrylic acid copolymer[4] (1 g) | Large agglomeration |
| 6 | 5% Scripset 520[5] (15 g) | Separation of microcapsules being very difficult |

Notes:
[1]Ethylene-maleic anhydride copolymer, manufactured by Monsanto Co.
[2]Reactive tenside disclosed in U.S. Pat. No. 3778383.
[3]Cationic urea resin, manufactured by British Industrial Plastic Limited Co.
[4]Content of acrylic acid being 42%, and average molecular weight of 400,000.
[5]Styrene-maleic anhydride copolymer, manufactured by Monsanto Co.

COMPARATIVE EXAMPLE 7 to 9

By using 20 g of the aqueous solution of the prepolymer prepared in Example 12 and the additives shown in Table 5 instead of the water-soluble cationic urea resin and Neoperex, 15 ml of the colour-former solution was emulsified under the same condition as Example 1. The pH was adjusted to 5.0 by sodium hydroxide before emulsification in the case where the pH of the dispersion became below 5.0.

The dispersion was adjusted to the pH of 3.8 by adding a 10% aqueous solution of citric acid while stirring slowly at 30° C. After one hour 30 ml of water was added, and then, microencapsulation was further proceeded for 2 hours with stirring.

A slurry of microcapsules obtained in Comparative Example 8 could not be filtered by a membrane filter, and free-flowing powder of microcapsules could not be obtained but a block of dried products was obtained. Accordingly, the slurries obtained in Comparative Examples 7 to 9 were dried per se by spraydrying to obtain powder. However, the dried product was not preferable for a pressure-sensitive recording paper.

TABLE 5

| Comparative Example No. | Additives | Properties of microcapsules |
|---|---|---|
| 7 | None | Large diameter of microcapsules and large variations thereof. |
| 8 | 5% Scripset 520[1] (15 g) | Separation of microcapsules being very difficult |
| 9 | 20% reactive tenside[2] (4 g) | Large agglomeration |

Notes:
[1]Styrene-maleic anhydride copolymer, manufactured by Monsanto Co.
[2]Reactive tenside disclosed in U.S. Pat. No. 3778383.

EXAMPLE 23

Solvent-resistance test:

Ten grams of powdered microcapsules obtained in Examples 1 to 3 and 10 to 22, and Comparative Examples 1 to 9 were ground in a mortar and 200 ml of toluene was added thereto and the mixture was kept standing. The supernatant was transferred into a 500-ml flask. The remaining microcapsules in the mortar were ground again and after adding 200 ml of toluene thereto, the mixture was well mixed and the whole mixture was charged into the 500-ml flask. After washing well the mortar and the pestle with toluene, the toluene was also transferred into the flask, and toluene was further charged into the flask so that the total volume in the flask was 500 ml. The amount of the solvent such as diisopropylnaphthalene used in the colour-former solution was determined by gas chromatography (hereinafter referred to as A).

On the other hand, 10 g of the same microcapsules was placed into a 100-ml conical flask with a glass stopper, and after adding 50 g of a solvent, namely, ethyl alcohol, toluene and isopropyl alcohol, respectively, into the flask, the flask was allowed to stand for 30 hours at 35° C. Then, the microcapsules in the flask was filtered and washed thoroughly with the solvent. The microcapsules were subjected to the same procedures as described above, and the amount of the solvent used for the colour-former solution was determined (hereinafter referred to as B).

The retaining degree of the core material after immersing into a solvent for printing ink was determined by the following formula:

$$\text{Retaining degree (\%)} = \frac{B}{A} \times 100$$

The solvent-resistance of microcapsule is better as the retaining degree is higher.

The results are shown in Table 6.

EXAMPLE 24

Preparation of pressure-sensitive recording paper

By using microcapsules obtained in Examples 1 to 3 and 10 to 22, printing ink composition was prepared.

Into a mixture of 580 g of isopropylalcohol and 60 g of ethylmethylketone, 140 g of cellulose nitrate (nitrogen content of 11.0%) and 60 g of modified rosin (Pentalyn 830, manufactured by Hercules Inc. USA) were dissolved, and 140 g of powdery microcapsules was added to obtain a printing ink composition.

A pressure-sensitive recording paper (CB sheet) was obtained by printing the ink composition on a paper by a flexo printing machine, and the recording paper was excellent in dimensional stability and caused no wrinkles on drying.

EXAMPLE 25

The CB sheet in Example 24 was placed in an oven at 150° C. for one hour and was removed out from the oven. The CB sheet was superposed on a CF sheet coated with a salt of salicylate (manufactured by Kanzaki Seishi Co.) so as to contact the coated surfaces of both sheets, and the superposed sheets were passed between the pinch rollers set to the contact pressure of 400 kg/cm² to be coloured (colour-developing operation A).

On the other hand, the CB sheet which was not placed in the oven was subjected to the same process mentioned above to be coloured (colour-developing operation B).

The colour density of the coloured surface of the CF sheet was measured by a reflection colour densitometer (manufactured by Macbeth Co., USA). The thermal-stability index was determined by the following formula:

$$\text{Index} = \frac{\text{Colour density in } A}{\text{Colour density in } B} \times 100$$

The results are shown in Table 6.

If the microcapsule has poor thermal stability, the paper shows poor colour development, so that the thermal stability index become smaller.

On the other hand, if the microcapsule has an excellent thermal stability, then the thermal-stability index is nearly 100.

According to the test for thermal-stability, in the case of microcapsules having a small strength of the wall, the wall is broken by the thermal expansion of the internal liquid to allow the flowing out, or in the case of microcapsules having permeable wall, the internal liquid flows out by its reduced viscosity and the raised internal pressure due to thermal expansion. In such cases, the thermal stability index shows a small value. Also in the case of incomplete microencapsulation, the index is small.

Furthermore, after exposing the coated surface of the CB sheet to sun light for 2 hours, it is superposed to the CF sheet as described above, and the superposed sheets are passed between the pinch rollers in the same manner as described above to be coloured (colour-developing operation C). On the other hand, the same procedures are carried out as above while using the CB sheet not yet exposed to sun light (colour-developing operation D).

The surface on which the colour was developed is subjected to determination of the colour density as described above.

The light stability index are determined by the following formula:

$$\text{Index} = \frac{\text{Colour density in } C}{\text{Colour density in } D} \times 100.$$

The results are shown in Table 6.

TABLE 6

| Example No. | Thermal-stability index (%) | light stability index (%) | Solvent-resistance (Retaining degree, %) | | |
|---|---|---|---|---|---|
| | | | ethanol | toluene | isopropanol |
| 1 | 97 | 70 | 98.4 | 98.3 | 98.5 |
| 2 | 88 | 70 | 89.9 | 90.1 | 89.7 |
| 3 | 92 | 67 | 91.1 | 91.5 | 92.0 |
| 10 | 99 | 80 | 98.3 | 99.0 | 98.9 |
| 11 | 90 | 65 | 86.5 | 87.7 | 86.9 |
| 12 | 102 | 83 | 99.5 | 99.8 | 99.9 |
| 13 | 99 | 79 | 98.9 | 99.0 | 98.7 |
| 14 | 98 | 80 | 99.3 | 99.7 | 99.6 |
| 15 | 100 | 83 | 99.2 | 99.5 | 99.6 |
| 16 | 97 | 79 | 98.0 | 98.4 | 98.3 |
| 17 | 85 | 62 | 89.0 | 91.1 | 90.0 |
| 18 | 82 | 60 | 89.2 | 90.2 | 89.5 |
| 19 | 94 | 70 | 90.5 | 91.2 | 91.3 |
| 20 | 98 | 80 | 99.6 | 99.7 | 99.6 |
| 21 | 94 | 60 | 89.5 | 90.2 | 88.9 |
| 22 | 100 | 89 | 99.9 | 100 | 100 |
| Comparative Examples No. | | | | | |
| 1 | — | — | 9.3 | 10.2 | 9.5 |
| 2 | — | — | 8.2 | 10.1 | 9.0 |
| 3 | — | — | 22.4 | 20.2 | 25.0 |
| 4 | — | — | 10.5 | 15.6 | 14.2 |
| 5 | — | — | 30.2 | 32.5 | 35.1 |
| 6 | — | — | 75.1 | 70.3 | 75.5 |
| 7 | — | — | 10.3 | 13.2 | 10.5 |
| 8 | — | — | 75.6 | 79.6 | 75.8 |
| 9 | — | — | 15.2 | 19.2 | 18.3 |

REFERENTIAL EXAMPLE

To the aqueous slurry containing 15 parts by weight of microcapsule prepared in Examples 10, 1, 12 and 20, 20 parts by weight of a 10% aqueous solution of polyvinylalcohol was mixed. The mixture was coated on a typewriting paper by a coating rod so that the amount of microcapsules coated was 4.0 g per one m² of the paper, and the paper coated was dried at 100° C. for 40 seconds to obtain a CB sheet.

Thermal- and light stability was tested in the same manner as Example 25. The results are shown in Table 7.

TABLE 7

| The example microcapsules are prepared | Thermal-stability index (%) | Light stability index (%) |
|---|---|---|
| 10 | 98 | 80 |
| 1 | 97 | 71 |
| 12 | 100 | 82 |
| 20 | 99 | 80 |

What is claimed is:

1. A process of preparing a microcapsule for a pressure-sensitive recording paper, comprising:
    (a) polycondensing a water-soluble cationic urea resin and at least one prepolymer selected from the group consisting of
        (i) melamine-formaldehyde prepolymers,
        (ii) urea-formaldehylde prepolymers, and
        (iii) melamine-urea-formaldehyde prepolymers, on the surface of a dispersed solvent droplet containing a colour-former in the presence of an anionic surfactant selected from the group consisting of salts of aliphatic acids, sulfate esters of higher alcohols and salts of alkylarylsulfonates;
    (b) concurrently causing complex-coacervation between said water-soluble cationic urea resin and said anionic surfactant;
    (c) said water-soluble cationic urea resin being in the range of 0.01 to 0.5 part by weight per on part by weight of said prepolymer; and
    (d) said anionic surfactant being in the range of 0.01 to 0.1 part by weight per one part by weight of said water-soluble cationic urea resin.

2. The process of claim 1, wherein the prepolymer is a melamine-formaldehyde prepolymer.

3. The process of claim 1, wherein the prepolymer is an urea-formaldehyde prepolymer.

4. The process of claim 2, wherein the prepolymer is a mixture of a melamine-formaldehyde prepolymer and an ureaformaldehyde prepolymer.

5. The process of claim 1, wherein the prepolymer is a melamine-urea-formaldehyde prepolymer.

6. The process of claim 1, wherein raw materials of the prepolymer contain 0.15 to 5 moles of melamine per one mole of urea.

7. A microcapsule for enclosing a colour-former solution for a pressure-sensitive recording paper, comprising the product of the process of claim 1.

* * * * *